US011863555B2

(12) United States Patent
Barton et al.

(10) Patent No.: US 11,863,555 B2
(45) Date of Patent: Jan. 2, 2024

(54) REMOTE ACCESS POLICIES FOR IOT DEVICES USING MANUFACTURER USAGE DESCRIPTION (MUD) FILES

(71) Applicant: Cisco Technology, Inc., San Jose, CA (US)

(72) Inventors: Robert E. Barton, Richmond (CA); Jerome Henry, Pittsboro, NC (US); Vinay Saini, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 44 days.

(21) Appl. No.: 17/174,906

(22) Filed: Feb. 12, 2021

(65) Prior Publication Data

US 2022/0263820 A1   Aug. 18, 2022

(51) Int. Cl.
*H04L 29/00*    (2006.01)
*H04L 9/40*     (2022.01)

(52) U.S. Cl.
CPC ...... *H04L 63/0876* (2013.01); *H04L 63/0209* (2013.01); *H04L 63/0272* (2013.01); *H04L 63/164* (2013.01); *H04L 63/20* (2013.01)

(58) Field of Classification Search
CPC ............. H04L 63/0876; H04L 63/0209; H04L 63/0272; H04L 63/164; H04L 63/20
See application file for complete search history.

(56) References Cited

U.S. PATENT DOCUMENTS

| 8,200,773 | B2 | 6/2012 | Bluestone et al. | |
|---|---|---|---|---|
| 10,595,320 | B2 | 3/2020 | Lear et al. | |
| 10,601,664 | B2 | 3/2020 | Kumar et al. | |
| 10,778,775 | B2 | 9/2020 | Lear et al. | |
| 2017/0093794 | A1* | 3/2017 | Natu | H04L 63/0876 |
| 2019/0319953 | A1* | 10/2019 | Lear | H04L 63/20 |
| 2019/0364110 | A1* | 11/2019 | Henry | H04L 67/12 |
| 2020/0137119 | A1 | 4/2020 | Jin et al. | |
| 2020/0177485 | A1* | 6/2020 | Shurtleff | H04L 63/0227 |

OTHER PUBLICATIONS

Feraudo, et al., "SoK: Beyond IoT MUD Deployments—Challenges and Future Directions", online: https://arxiv.org/abs/2004.08003 , Apr. 2020, 7 pages, arXiv.org.

(Continued)

*Primary Examiner* — Jeffrey C Pwu
*Assistant Examiner* — Helai Salehi
(74) *Attorney, Agent, or Firm* — BEHMKE INNOVATION GROUP LLC; Kenneth J. Heywood; James J. Wong

(57) ABSTRACT

In one embodiment, a management service for a network that is executed by one or more devices establishes a trust relationship with an entity associated with an endpoint in the network. The management service receives, via a Manufacturer Usage Description (MUD) file for the endpoint, an indication that the entity desires remote access to the endpoint in the network. The management service configures, based on the indication, the network to provide a remote access connection between the entity and the endpoint in the network. The management service provides, to the entity, credentials to the entity for the remote access connection.

18 Claims, 11 Drawing Sheets

(56) References Cited

OTHER PUBLICATIONS

Matheu, et al., "Security Architecture for Defining and Enforcing Security Profiles in DLT/SDN-Based IoT Systems", Sensors 20(7), Mar. 2020, 33 pages, MDPI.com, Basel, Switzerland.
Matheu, et al. "Extending MUD Profiles Through an Automated IoT Security Testing Methodology", IEEE Access vol. 7, Oct. 2019, 20 pages, IEEE.
Lear, et al., "Manufacturer Usage Description Specification", Internet Engineering Task Force, Request for Comments 8520, Mar. 2019, 60 pages, IETF Trust.
"Purdue Enterprise Reference Architecture", online: https://en.wikipedia.org/wiki/Purdue_Enterprise_Reference_Architecture, Apr. 2020, 2 pages, Wikimedia Foundation, Inc.

\* cited by examiner

REMOTE ACCESS POLICIES FOR IOT DEVICES USING MANUFACTURER USAGE DESCRIPTION (MUD) FILES

TECHNICAL FIELD

The present disclosure relates generally to computer networks, and, more particularly, to remote access policies for Internet of Things (IoT) devices using Manufacturer Usage Description (MUD) files.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

Increasingly, vendors and device manufacturers are requesting access to the IoT networks in which their devices are deployed. This is done for a variety of reasons including troubleshooting, data analytics, adjusting device configurations, and software updates. Indeed, it is a modem trend for these types of entities maintain cloud services to which their devices may connect after deployment.

Network security mechanisms can prevent an IoT device from communicating with its manufacturer or vendor. Indeed, many industrial IoT networks make use of a demilitarized zone (DMZ) or other security mechanisms that could prevent these entities from communicating with their devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
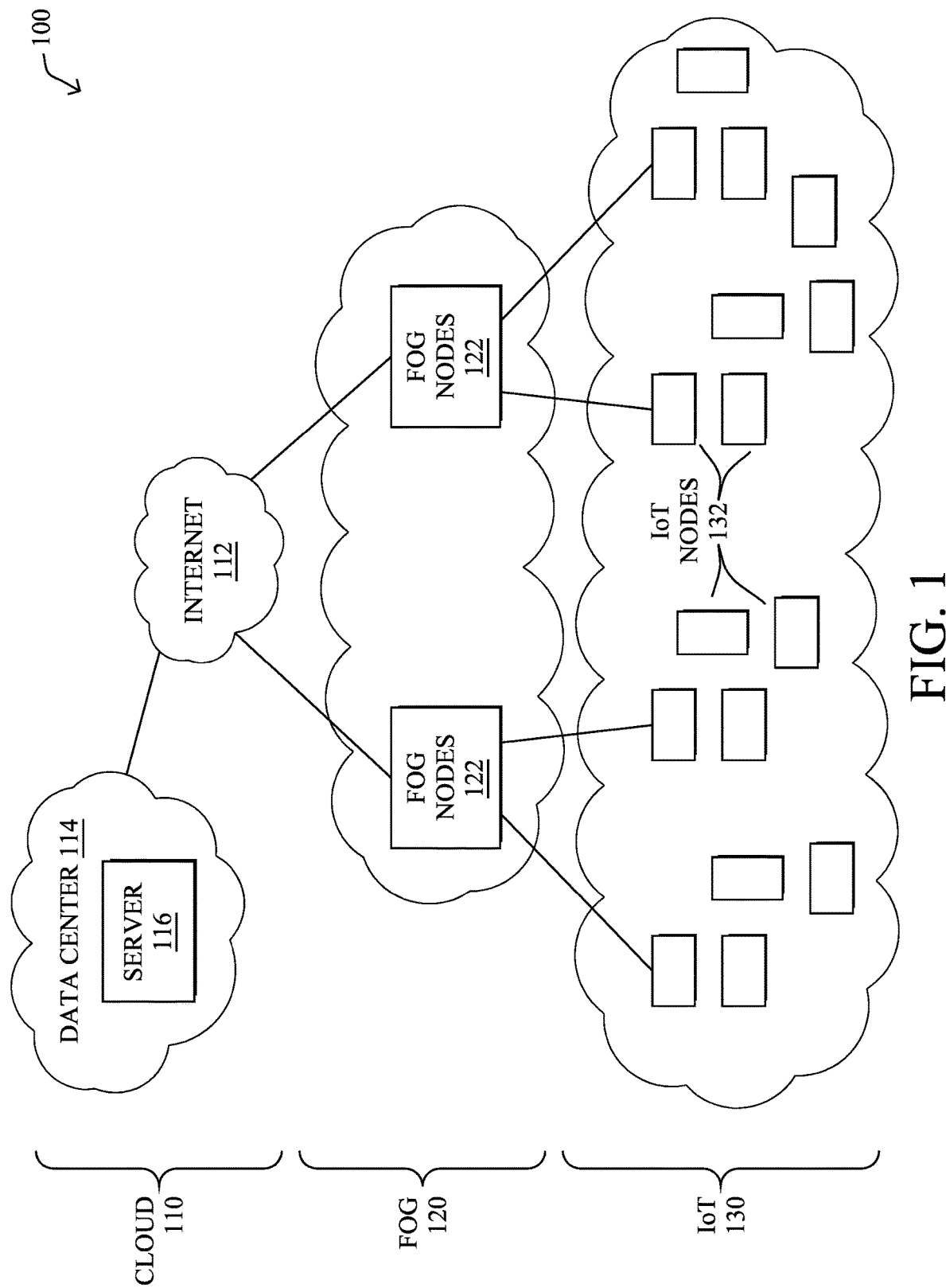
FIG. 1 illustrate an example network.

According to one or more embodiments of the disclosure, a management service for a network that is executed by one or more devices establishes a trust relationship with an entity associated with an endpoint in the network. The management service receives, via a Manufacturer Usage Description (MUD) file for the endpoint, an indication that the entity desires remote access to the endpoint in the network. The management service configures, based on the indication, the network to provide a remote access connection between the entity and the endpoint in the network. The management service provides, to the entity, credentials to the entity for the remote access connection.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
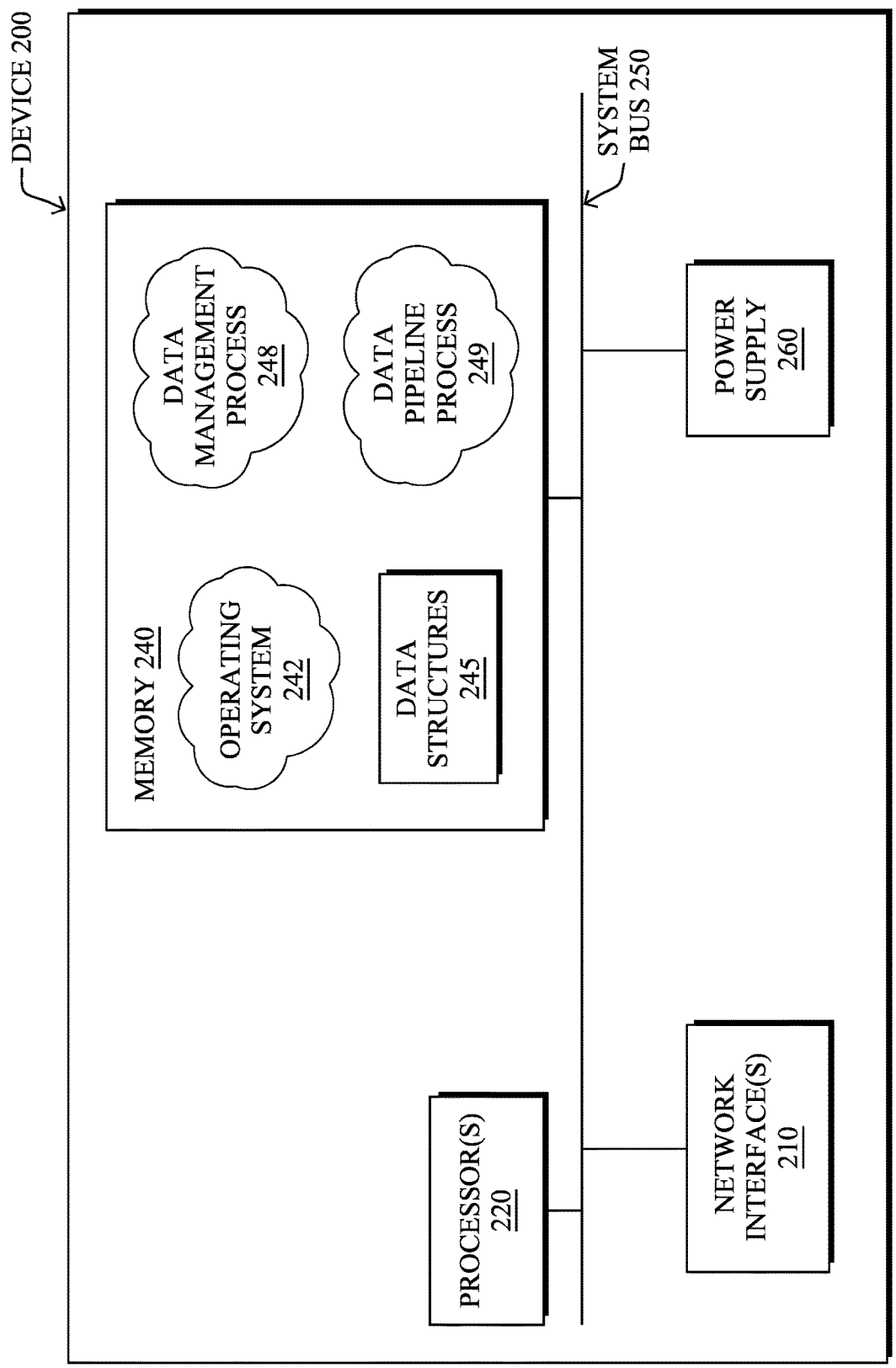
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative data management process 248 and/or a data pipeline configuration process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
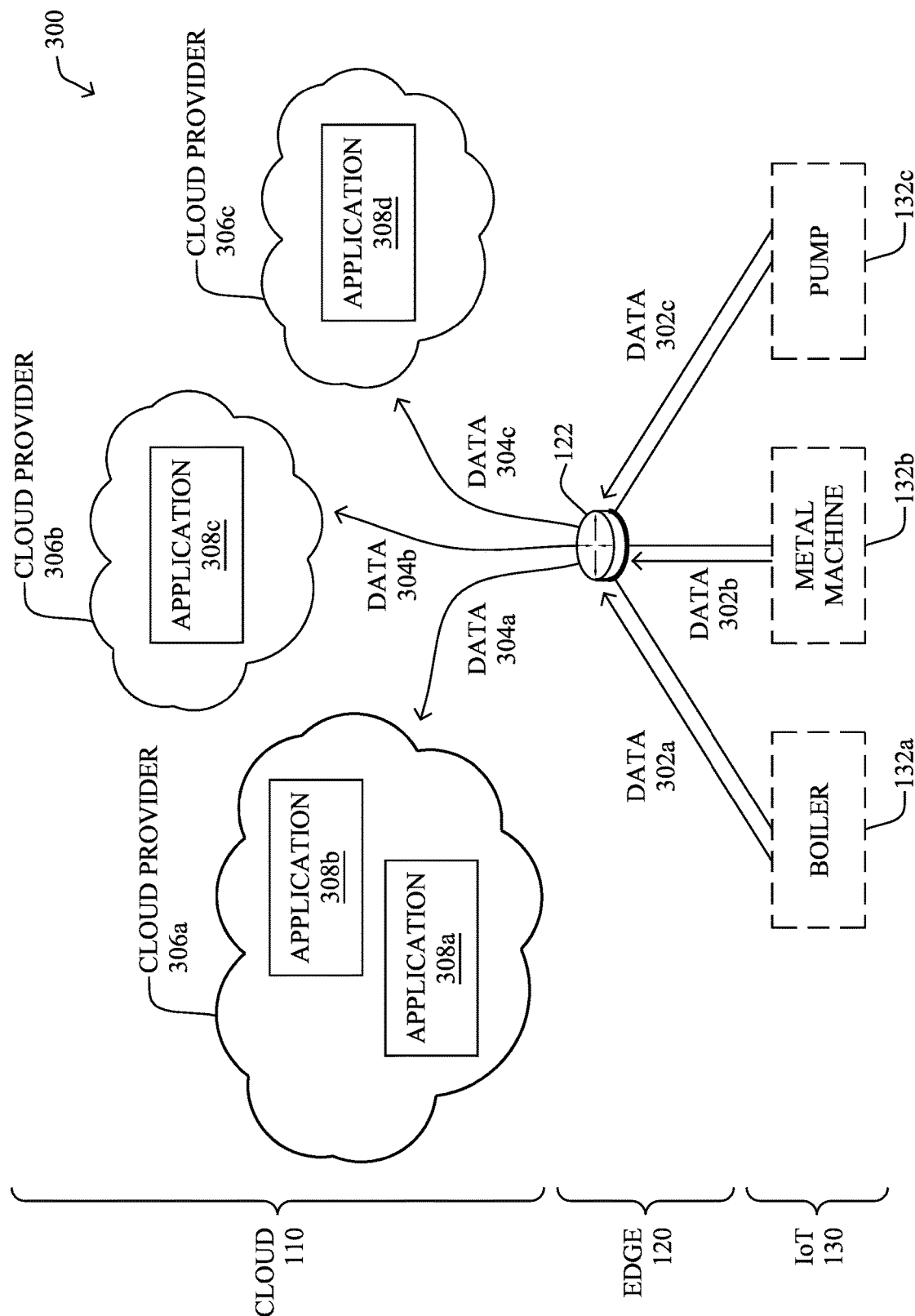
FIG. 3 illustrates an example network architecture for edge to multi-cloud processing and governance.

FIG. 3 illustrates an example network architecture 300 for edge to multi-cloud processing and governance, according to various embodiments. As shown, consider the case of an IoT network at IoT layer 130 that comprises a plurality of nodes 132, such as node 132a (e.g., a boiler), node 132b (e.g., a metal machine), and node 132c (e.g., a pump). Notably, the IoT network at IoT layer 130 may comprise any numbers of sensors and/or actuators. For instance, the network may be located in an industrial setting, such as a factory, port, substation, or the like, a smart city, a stadium, a conference or office building, or any other location in which IoT devices may be deployed.

As noted above, as the IoT evolves, the variety of IoT devices will continue to grow, as well as the number of applications associated with the IoT devices. As a result, multiple cloud-based applications may take as input measurements or other data generated by a particular IoT device/node. For instance, as shown, assume that IoT nodes 132a-132c generate data 302a-302c, respectively, for consumption by any number of applications 308 hosted by different cloud providers 306, such as Microsoft Azure, Software AG, Quantela, MQTT/DC, or the like.

To complicate the collection and distribution of data 302a-302c, the different applications 308 may also require different sets of data 304a-304c from data 302a-302c. For instance, assume that cloud provider 306a hosts application 308a, which is a monitoring/management application used by the operator of the IoT network. In addition, cloud provider 306a may also host application 308b, which is a developer application that allows the operator of the IoT network to develop and deploy utilities and configurations for the IoT network. Another application, application 308c, may be hosted by an entirely different cloud provider 306b and be used by the vendor or manufacturer of a particular IoT node 132 for purposes. Finally, a further application, application 308d, may be hosted by a third cloud provider 306c, which is used by technicians for purposes of diagnostics and the like.

From the standpoint of the edge device 122, such as a router or gateway at the edge of the IoT network, the lack of harmonization between data consumers can lead to overly complicated data access policies, virtual models of IoT nodes 132 (e.g., 'device twins' or 'device shadows') that are often not portable across cloud providers 306, and increased resource consumption. In addition, different IoT nodes may communicate using different protocols within the IoT network. For instance, IoT nodes 132a-132c may communicate using MQTT, Modbus, OPC Unified Architecture (OPC UA), combinations thereof, or other existing communication protocols that are typically used in IoT networks. As a result, the various data pipelines must be configured on an individual basis at edge device 122 and for each of the different combinations of protocols and destination cloud providers 306.

Figure 4A:
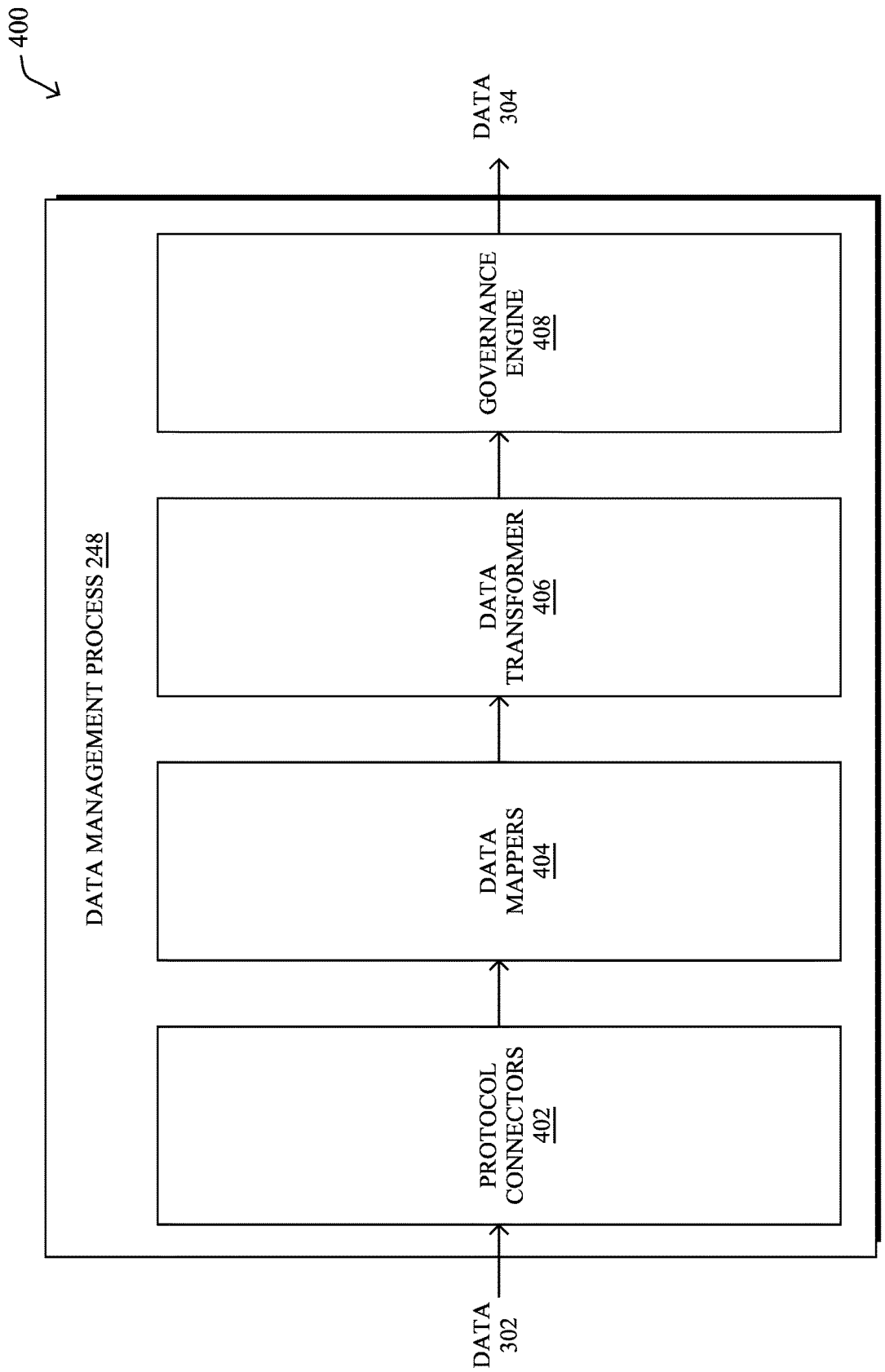
FIGS. 4A-4B illustrate examples of data processing by an edge device in a network.

FIG. 4A illustrates an example architecture 400 for data management process 248, according to various embodiments. As shown, data management process 248 may comprise any or all of the following components: a plurality of protocol connectors 402, data mappers 404, a data transformer 406, and/or a governance engine 408. Typically, these components are executed on a single device located at the edge of the IoT network. However, further embodiments provide for these components to be executed in a distributed manner across multiple devices, in which case the combination of devices can be viewed as a singular device for purposes of the teachings herein. Further, functionalities of the components of architecture 400 may also be combined, omitted, or implemented as part of other processes, as desired.

During execution, protocol connectors 402 may comprise a plurality of southbound connectors that are able to extract data 302 from traffic in the IoT network sent via any number of different protocols. For instance, protocol connectors 402 may include connectors for OPC UA, Modbus, Ethernet/IP, MQTT, and the like. Accordingly, when the device executing data management process 248 (e.g., device 200) receives a message from the IoT network, such as a packet, frame, collection thereof, or the like, protocol connectors 402 may process the message using its corresponding connector to extract the corresponding data 302 from the message.

Once data management process 248 has extracted data 302 from a given message using the appropriate connector in protocol connectors 402, data mappers 404 may process the extracted data 302. More specifically, in various embodiments, data mappers 404 may normalize the extracted data 302. Typically, this may entail identifying the data extracted from the traffic in the network as being of a particular data type and grouping the data extracted from the traffic in the network with other data of the particular data type. In some instances, this may also entail associating a unit of measure with the extracted data 302 and/or converting a data value in one unit of measure to that of another.

In various embodiments, once data 302 has been extracted and normalized, data transformer 406 may apply any number of data transformation to the data. In some embodiments, data transformer 406 may transform data 302 by applying any number of mathematical and/or symbolic operations to it. For instance, data transformer 406 may apply a data compression or data reduction to the extracted and normalized data 302, so as to summarize or reduce the volume of data transmitted to the cloud. To do so, data transformer 406 may sample data 302 over time, compute statistics regarding data 302 (e.g., its mean, median, moving average, etc.), apply a compression algorithm to data 302, combinations thereof, or the like.

In further embodiments, data transformer 406 may apply analytics to the extracted and normalized data 302, so as to transform the data into a different representation, such as an alert or other indication. For instance, data transformer 406 may apply simple heuristics and/or thresholds to data 302, to transform data 302 into an alert. In another embodiment, data transformer 406 may apply machine learning to data 302, to transform the data.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Data transformer 406 may employ one or more supervised, unsupervised, or semi-supervised machine learning models. Generally, supervised learning entails the use of a training set of data that is used to train the model to apply labels to the input data. For example, the training data may include samples of 'good' readings or operations and 'bad' readings or operations that are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. For instance, an unsupervised model may Semi-supervised learning models take a middle ground approach that uses a greatly reduced set of labeled training data.

Example machine learning techniques that data transformer 406 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

In further embodiments, data transformer 406 may comprise a scripting engine that allows developers to deploy any number of scripts to be applied to data 302 for purposes of the functionalities described above. For instance, an application developer may interface with application 308b shown previously in FIG. 3, to develop and push various scripts for execution by data transformer 406, if allowed to do so by policy. In other cases, previously developed scripts may also be pre-loaded into data transformer 406 and/or made available by the vendor or manufacturer of the device executing data management process 248 for deployment to data transformer 406.

According to various embodiments, another potential component of data management process 248 is governance engine 408 that is responsible for sending the data 302 transformed by data transformer 406 to any number of cloud providers as data 304. In general, governance engine 408 may control the sending of data 304 according to a policy. For instance, governance engine 408 may apply a policy that specifies that data 304 may be sent to a particular cloud provider and/or cloud-based application, but should not be sent to others. In some embodiments, the policy enforced by governance engine 408 may control the sending of data 304 on a per-value or per-data type basis. For instance, consider the case of an IoT node reporting a temperature reading and pressure reading. In such a case, governance engine 408 may send the temperature reading to a particular cloud provider as data 304 while restricting the sending of the pressure reading, according to policy.

As would be appreciated, by unifying the policy enforcement via governance engine 408, the various stakeholders in the data pipelines are able to participate in the creation and maintenance of the enforced policies. Today, the various data pipelines built to support the different network protocols and cloud vendors results in a disparate patchwork of policies that require a level of expertise that not every participant may possess. In contrast, by unifying the policy enforcement via governance engine 408, personnel such as security experts, data compliance representatives, technicians, developers, and the like can participate in the administration of the policies enforced by governance engine 408.

Figure 4B:
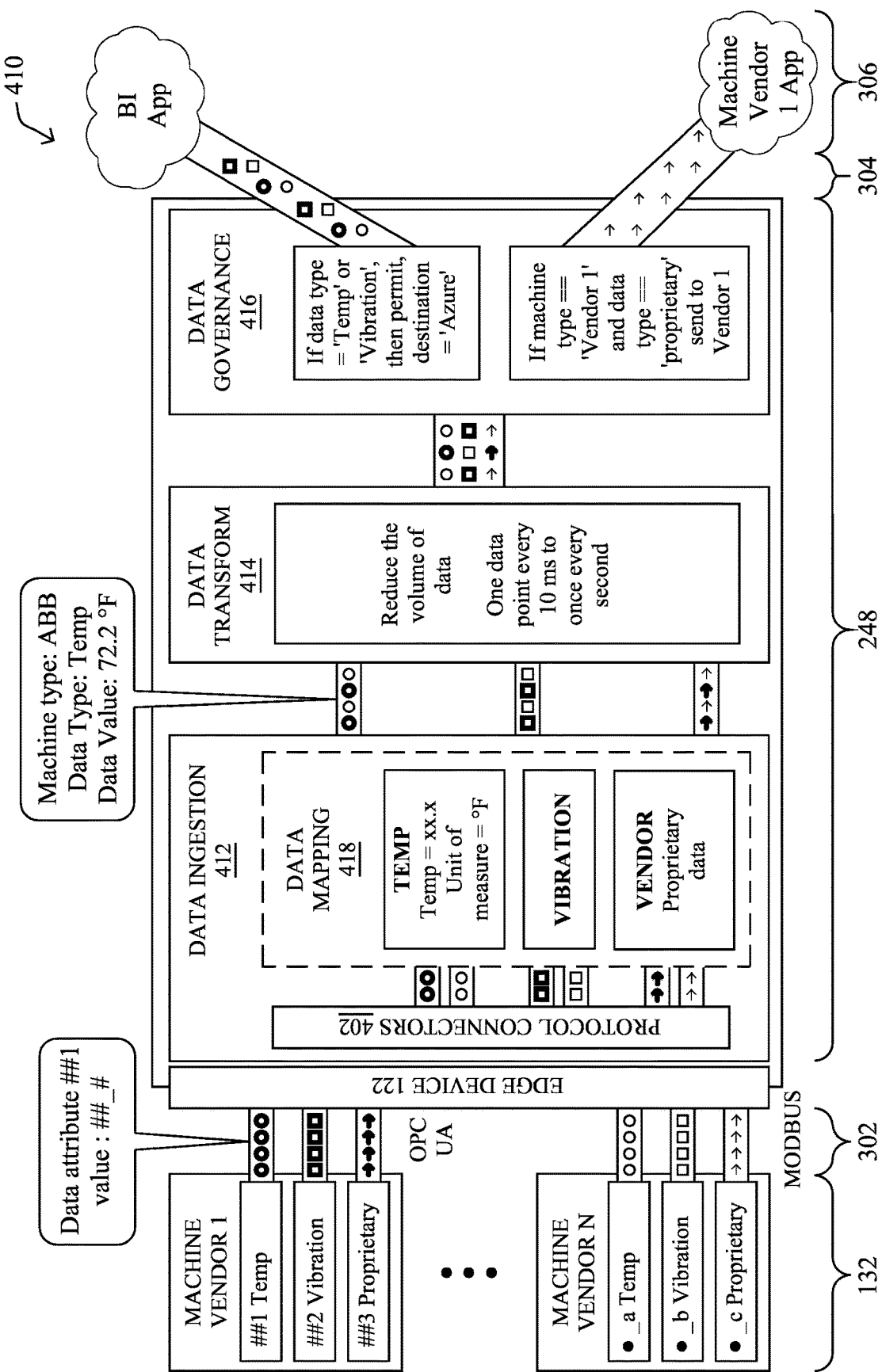

FIG. 4B illustrates an example 410 of the operation of data management process 248 during execution, according to various embodiments. As shown, assume that edge device 122 described previously (e.g., a device 200) executes data management process 248 at the edge of an IoT network that comprises IoT nodes 132. During operation, edge device 122 may communicate with IoT nodes 132 in the network that comprise devices from n-number of different vendors.

Each set of vendor devices in IoT nodes 132 may generate different sets of data, such as sensor readings, computations, or the like. For instance, the devices from a first machine vendor may generate data such as a proprietary data value, a temperature reading, and a vibration reading. Similarly, the devices from another machine vendor may generate data such as a temperature reading, a vibration reading, and another data value that is proprietary to that vendor.

As would be appreciated, the data 302 generated from each group of IoT nodes 132 may use different formats that are set by the device vendors or manufacturers. For instance, two machines from different vendors may both report temperature readings, but using different data attribute labels (e.g., "temp=," "temperature=," "##1," "*_a," etc.). In addition, the actual data values may differ by vendor, as well. For instance, the different temperature readings may report different levels of precision/number of decimals, use different units of measure (e.g., Celsius, Fahrenheit, Kelvin, etc.), etc.

Another way in which data 302 generated by IoT nodes 132 may differ is the network protocol used to convey data 302 in the network. For instance, the devices from one machine vendor may communicate using the OPC UA protocol, while the devices from another machine vendor may communicate using the Modbus protocol.

In response to receiving data 302 from IoT nodes 132, data management process 248 of edge device 122 may process data 302 in three stages: a data ingestion phase 412, a data transformation phase 414, and a data governance phase 416. These three processing phases operate in conjunction with one another to allow edge device 122 to provide data 304 to the various cloud providers 306 for consumption by their respective cloud-hosted applications.

During the data ingestion phase 412, protocol connectors 402 may receive messages sent by IoT nodes 132 in their respective protocols, parse the messages, and extract the relevant data 302 from the messages. For instance, one protocol connector may process OPC UA messages sent by one set of IoT nodes 132, while another protocol connector may process Modbus messages sent by another set of IoT nodes 132. Once protocol connectors 402 have extracted the relevant data 302 from the messages, data management process 248 may apply a data mapping 418 to the extracted data, to normalize the data 302. For instance, data management process 248 may identify the various types of reported data 302 and group them by type, such as temperature measurements, vibration measurements, and vendor proprietary data. In addition, the data mapping 418 may also entail standardizing the data on a particular format (e.g., a particular number of digits, unit of measure, etc.). The data mapping 418 may also entail associating metadata with the extracted data 302, such as the source device type, its vendor, etc.

During its data transformation phase 414, data management process 248 may apply various transformations to the results of the data ingestion phase 412. For instance, assume that one IoT node 132 reports its temperature reading every 10 milliseconds (ms). While this may be acceptable in the IoT network, and even required in some cases, reporting the temperature readings at this frequency to the cloud-providers may represent an unnecessary load on the WAN connection between edge device 122 and the cloud provider(s) 306 to which the measurements are to be reported. Indeed, a monitoring application in the cloud may only need the temperature readings at a frequency of once every second, meaning that the traffic overhead to the cloud provider(s) 306 can be reduced by a factor of one hundred by simply reporting the measurements at one second intervals. Accordingly, data transformation phase 414 may reduce the volume of data 304 sent to cloud provider(s) 306 by sending only a sampling of the temperature readings (e.g., every hundred), an average or other statistic(s) of the temperature readings in a given time frame, or the like.

During its data governance phase 416, data management process 248 may apply any number of different policies to the transformed data, to control how the resulting data 304 is sent to cloud provider(s) 306. For instance, one policy enforced during data governance phase 416 may specify that if the data type='Temp' or 'Vibration,' then that data is permitted to be sent to destination='Azure,' for consumption by a BI application hosted by Microsoft Azure. Similarly, another policy may specify that if the machine type='Vendor 1' and the data type='proprietary,' then the corresponding data can be sent to a cloud provider associated with the vendor.

In some embodiments, the policy enforced during data governance phase 416 may further specify how data 304 is sent to cloud providers 306. For instance, the policy may specify that edge device 122 should send data 304 to a particular cloud provider 306 via an encrypted tunnel, using a particular set of one or more protocols (e.g., MQTT), how the connection should be monitored and reported, combinations thereof, and the like.

As noted above, IoT data is increasingly managed by a cloud-based system (e.g., Amazon Web Services IoT Core, Azure IoT Hub, Asset Vision and Edge Intelligence by Cisco Systems, Inc., etc.). In this model, the local IoT network sends data to a cloud data aggregation and brokering service, such as an MQTT broker, a LoRaWAN Network Server, or the like. In turn, that data is then passed back to the desired data repository of the owner of the IoT network, such as a data warehouse or big data system, where the data can be analyzed. Typically, the location of the data consumption service is different than the data warehouse, to which the data is ultimately sent. For example, a network operator may want their data passed to an on-site Hadoop, NoSQL, or Spark system in their data center, to a Google machine learning service, or some other place.

While mechanisms in FIGS. 4A-4B allow for data to be pushed from a given IoT node 132 to any number of data consumers, such as their vendors, manufacturers, or other associated entities, there are also a number of instances in which these entities may require a remote connection directly to that node. For instance, the remote entity may use an outside connection to a node 132 for purposes of troubleshooting, data analytics, adjusting device configurations, performing software updates, or the like.

Despite the increasing demand for remote access to IoT nodes after deployment to a network, configuration of the remote access remains quite challenging. Indeed, many networks employ a series of security mechanisms that are specifically designed to prevent remote access. For instance, a factory automation network may employ a demilitarized zone (DMZ), firewall(s), and the like, to prevent malicious actors from accessing the devices in the network and causing harm (e.g., by controlling a motor past its safe operating range, shutting down a manufacturing process, etc.).

——Remote Access Policies for IoT Devices Using MUD Files——

The techniques introduced herein allow for the automatic configuration of a remote access policy that allows an outside entity access to an IoT device/node deployed to a network. In some aspects, the techniques herein leverage the Manufacturer Usage Description (MUD) protocol, to signal the desire to access an IoT node, remotely. In turn, a service of the network may configure the requisite network access policy and provide credentials to the requesting entity.

Illustratively, the techniques described herein may be performed by hardware, software, and/or firmware, such as in accordance with data management process 248 and/or data pipeline configuration process 249, which may include computer executable instructions executed by the processor 220 (or independent processor of interfaces 210) to perform functions relating to the techniques described herein.

Specifically, in various embodiments, a management service for a network that is executed by one or more devices establishes a trust relationship with an entity associated with an endpoint in the network. The management service receives, via a Manufacturer Usage Description (MUD) file for the endpoint, an indication that the entity desires remote access to the endpoint in the network. The management service configures, based on the indication, the network to provide a remote access connection between the entity and the endpoint in the network. The management service provides, to the entity, credentials to the entity for the remote access connection.

Operationally, the techniques herein propose leveraging the Manufacturer Usage Description (MUD) protocol to signal to a deployment network the desire for an entity to access a particular IoT node, remotely. As would be appreciated, the MUD protocol is specified in the Internet Engineering Task Force (IETF) Request for Comments (RFC) 8520, entitled "Manufacturer Usage Description Specification," by E. Lear, et al. In general, MUD is used allow a manufacturer or similar entity to specify to a deployment network a description of an IoT device/node. Traditionally, this has been done so that the network can restrict the devices to which that node can communicate. For instance, in the case of a smart lightbulb, the network may prohibit the lightbulb from communicating with other devices on the network, such as personal computers, refrigeration equipment, etc., based on its description in MUD. In other words, MUD is primarily focused on the configuration of security policies, as opposed to network policies. Thus, even if the smart lightbulb is allowed to communicate with an outside service through the use of MUD in a traditional manner, this does not mean that the outside service will be allowed to access the lightbulb, remotely.

FIGS. 5A-5E illustrates an example of the automatic configuration of a network to allow an entity remote access to a node, according to various embodiments. In general, the techniques herein allow a new IoT node deployed to a network to express a Uniform Resource Indicator (URI) at which a MUD file is located. According to various embodiments, this MUD file includes not only a description of the IoT node, but also the security characteristics of the device, such as a desire of an outside entity to access the IoT node, remotely. In turn, the network services for the network may automatically configure the network to allow the entity to access the IoT node, remotely, if there is a pre-existing trust relationship with that entity.

Figure 5A:
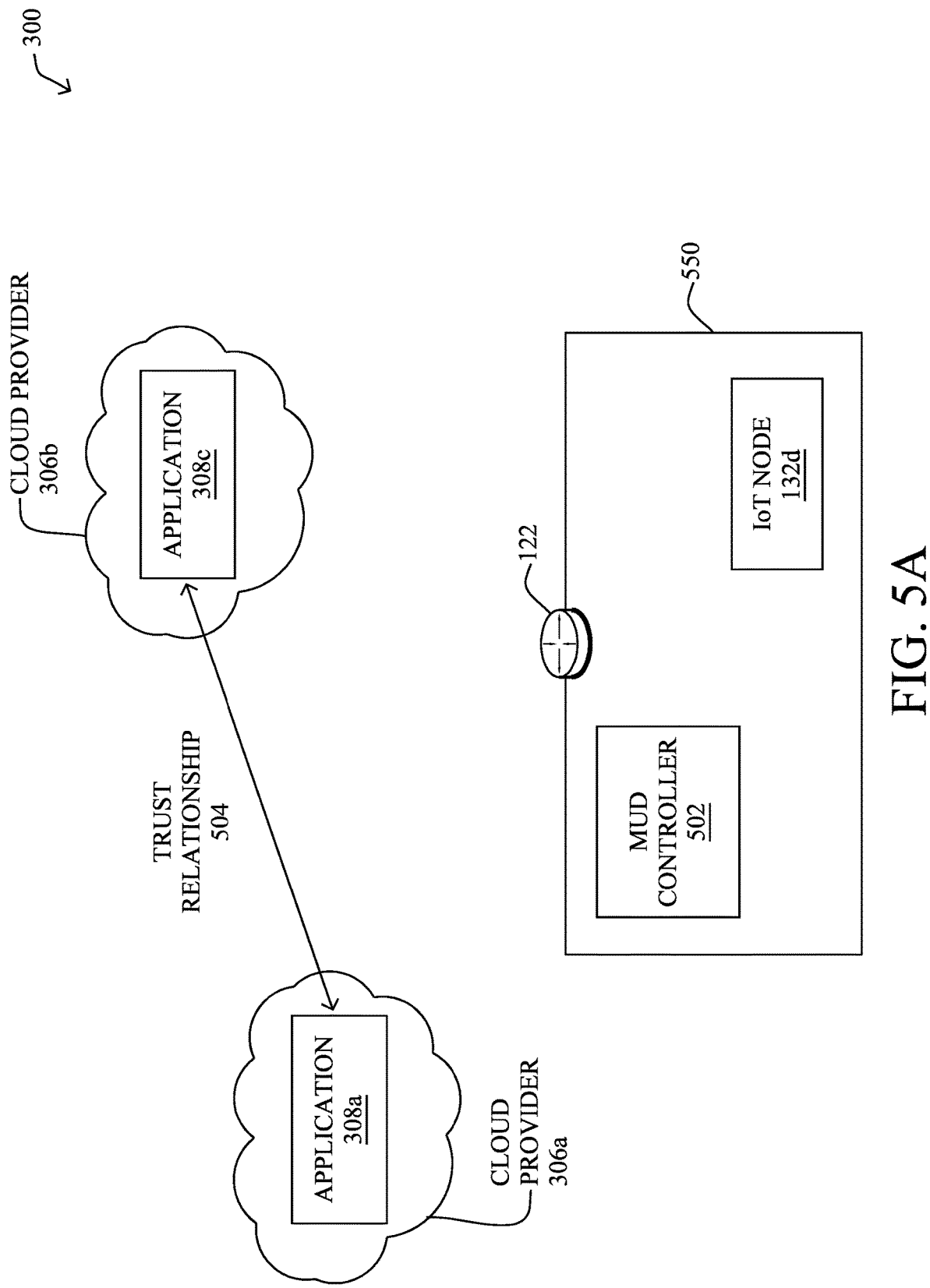
FIGS. 5A-5E illustrates an example of the automatic configuration of a network to allow an entity remote access to a node.

As shown in FIG. 5A, and continuing the example of FIG. 3, assume that there is a new IoT node 132d that is deployed to the local network 550 of edge device 122. In various embodiments, there may be a MUD controller 502 within local network 550 that is configured to obtain the MUD file for IoT node 132d. For instance, MUD controller 502 may be part of a local or cloud-based identity security mechanism, such as an authentication, authorization, and accounting (AAA) service or other service responsible for deploying security policies to network 550. For instance, MUD controller 502 may be a component of an Identity Services Engine (ISE) by Cisco Systems, Inc. or similar policy enforcement service, or in communication therewith.

For purposes of illustration of the techniques herein, assume that application 308a functions as a supervisory service that oversees the data pipelines between edge device 122 and the various cloud providers 306. For instance, application 308a may take the form of Edge Intelligence Cloud by Cisco Systems. Inc., or another service that provides similar supervisory oversight. In addition, assume that application 308c is operated by an entity (e.g., a device manufacturer, vendor, etc.) associated with IoT node 132d.

According to various embodiments, application 308a and application 308c may establish a trust relationship 504, prior to the deployment of IoT node 132d to local network 550.

For instance, to establish trust relationship 504, the operators of application 308a and application 308c may generate and exchange certificate information, other credential data, etc., to form a secure communication channel between application 308a and application 308c. In some instances, trust relationship 504 may be established by the provider of application 308a, such as in the case of the entity associated with application 308c being a well-known and trusted device manufacturer. However, in other instances, application 308a may establish trust relationship 504 in response to a request to do so by the operator of local network 550.

Figure 5B:
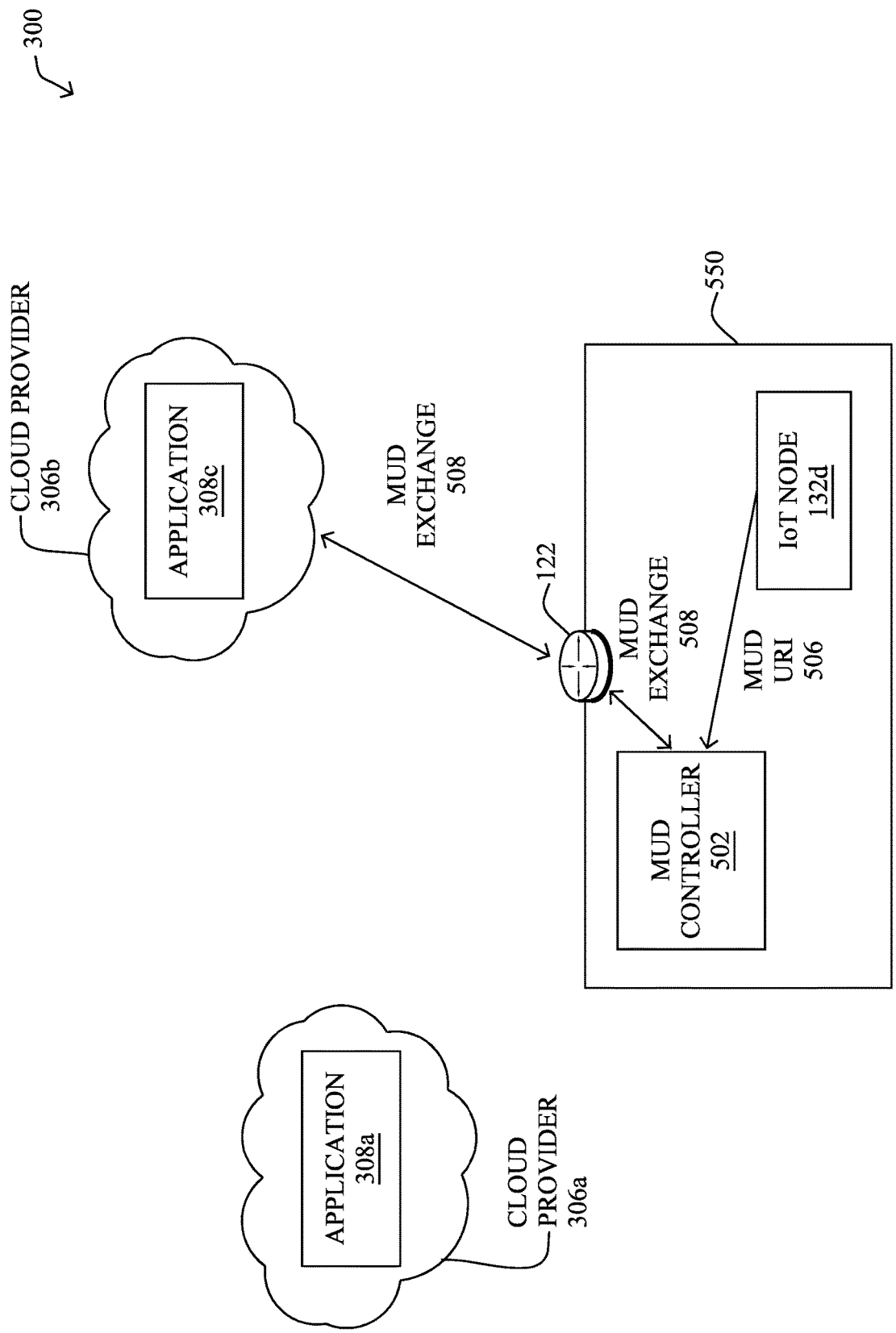

As shown in FIG. 5B, when IoT node 132d joins local network 550, it may provide a MUD Uniform Resource Locator (URI) 506 to local network 550, in accordance with the MUD protocol. In general, MUD URI 506 indicates the address at which a MUD file can be retrieved for IoT node 132d. For instance, as shown, IoT node 132d may provide MUD URI 506 to MUD controller 502 during the onboarding of IoT node 132d to local network 550.

In response to receiving MUD URI 506, MUD controller 502 may initiate a MUD exchange 508 during which MUD controller 502 downloads a MUD file for IoT node 132d from the location specified by MUD URI 506. Typically, this URI will be at a location associated with the manufacturer, vendor, or other entity that supplied IoT node 132d to local network 550. For instance, as shown and for sake of illustration, assume that MUD URI 506 is located at cloud provider 306b. In such a case, MUD controller 502 may retrieve a MUD file for IoT node 132d from cloud provider 306b via MUD exchange 508.

According to various embodiments, the MUD file downloaded by MUD controller 502 via MUD exchange 508 for IoT node 132d may also include an addendum that indicates a desire by the entity associated with IoT node 132d to access IOT node 132d, remotely. For instance, in one embodiment, the manufacturer of IoT node 132d may include an indication in the MUD file for IoT node 132d that indicates a desire to establish a virtual private network (VPN) connection to 132d in local network 550.

Figure 5C:
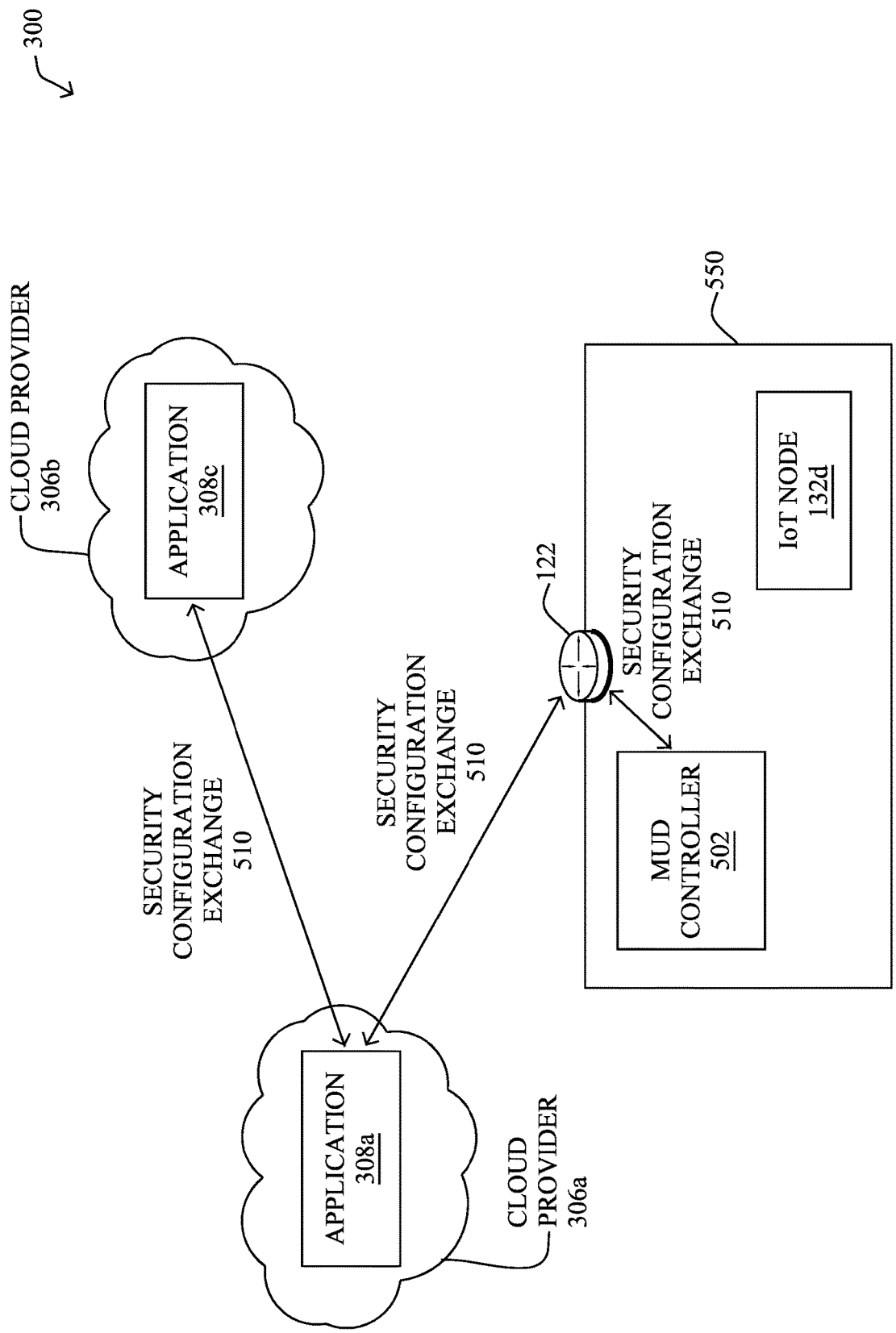

As shown in FIG. 5C, once MUD controller 502 has obtained the MUD device profile for IoT node 132d, it may initiate a security configuration exchange 510 with application 308a, to configure local network 550 to allow the entity associated with application 308c remote access to IoT node 132d in local network 550. More specifically, in some embodiments, MUD controller 502 may augment the MUD profile of IoT node 132d with network-specific information about IoT node 132d, such as its location, current level of the Purdue model, etc., and provide this augmented information to application 308a.

According to various embodiments, application 308a may use the information provided to it regarding IoT node 132d during security configuration exchange 510, to configure a data pipeline from edge device 122 to cloud provider 306b (e.g., a pipeline as in FIG. 4B). In addition to configuring such a data pipeline, or in lieu thereof, application 308a may configure the networking devices of local network 550 to provide a remote connection to IoT node 132d, so that the entity associated with application 308c can access IoT node 132d, directly, based on the information provided to it during security configuration exchange 510. For instance, application 308a may, as part of security configuration exchange 510, provide a VPN configuration to edge device 122 that allows application 308c to form a VPN connection to IoT node 132d. In addition, during security configuration exchange 510, application 308a may push any relevant security policies for this connection to local network 550, based on the contextual information regarding IoT node 132d in local network 550. For instance, during security configuration exchange 510, application 308a may configure one or more access devices for local network 550 (e.g., a VPN concentrator, a cloud firewall (SIG), a reverse proxy, remote desktop protocol service, etc.), to support the remote connection to IoT node 132d.

In various embodiments, another participant in security configuration exchange 510 may also be the entity requesting remote access to IoT node 132d. For instance, as shown, application 308c may provide more specific access information to application 308a regarding its requested remote connections, as part of security configuration exchange security configuration exchange 510. This access information may include, in various embodiments, information such as the protocols through which application 308c is to communicate with IoT node 132d, the specific commands that application 308c may issue to IoT node 132d via the remote connection, the desired bandwidth of the remote connection, time of day connection policies, or the like.

In some embodiments, any given access parameter requested by application 308c may also be flagged by application 308c as 'required' or 'optional, but desired.' By doing so, this can allow application 308a to still set up a remote connection to IoT node 132d, even such a connection will not satisfy every access parameter desired by the remote entity. In various embodiments, this access information may be specified in the retrieved MUD file for IoT node 132d, provided directly to application 308a by 308c as part of the formation of the trust relationship 504 between application 308a and application 308c, or during the configuration phase for the remote connection.

Regardless of when application 308a receives the requested access parameters for the remote connection, application 308a may compare the requested parameters for the remote connection to one or more security policies, to determine whether to allow or deny the remote connection or make changes to the requested parameters. For instance, in some cases, application 308a may still allow and configure a remote connection for the entity associated with application 308c, but with altered parameters (e.g., a reduced bandwidth than what was requested, a subset of the allowed protocols, etc.).

Figure 5D:
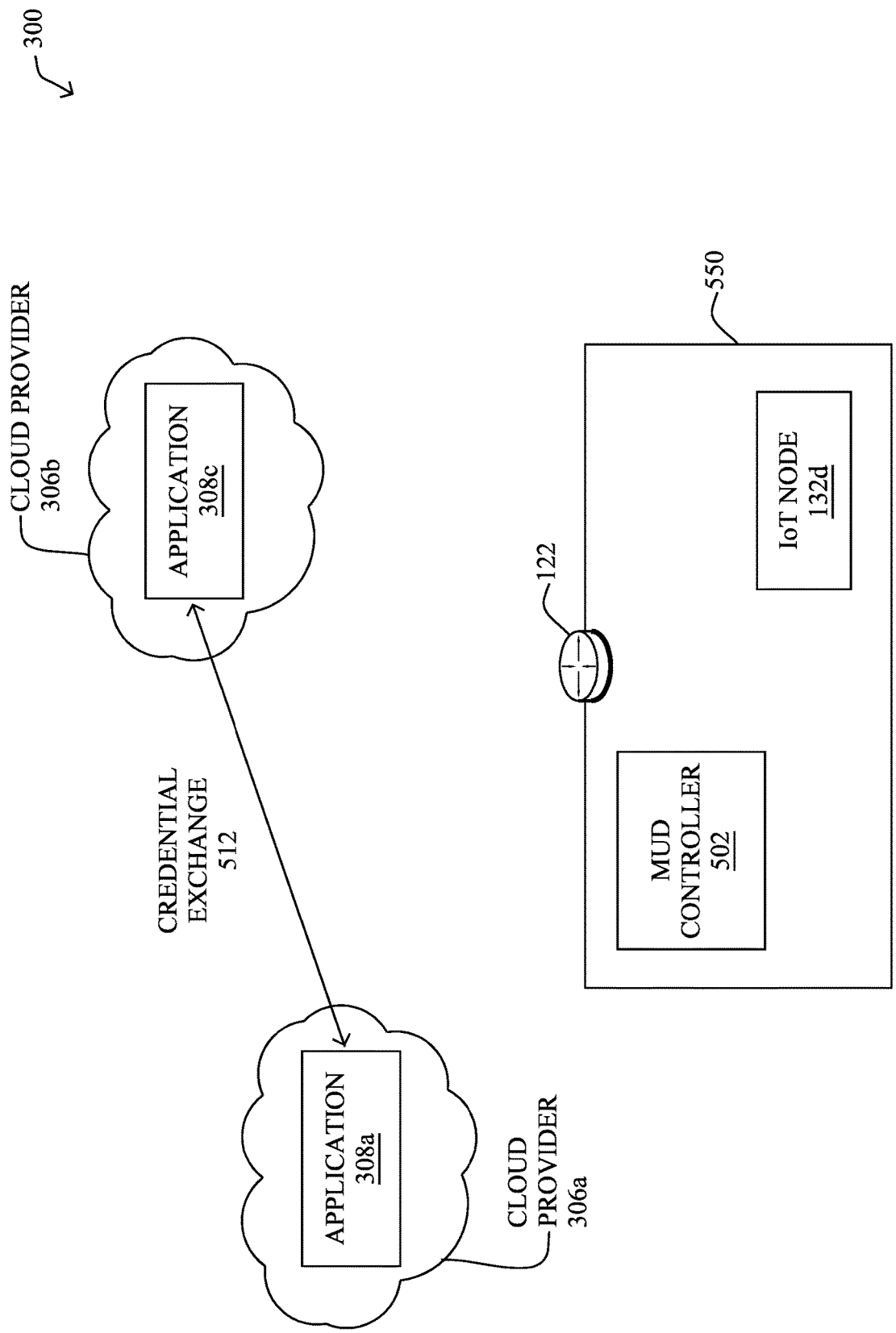

As shown in FIG. 5D, application 308a may notify application 308c of its decision regarding the requested remote connection to IoT node 132d. For instance, if the requested parameters for the remote connection violate a policy for local network 550, application 308a may notify application 308c of this. In turn, application 308a may allow application 308c to request different parameters for the remote connection, in some embodiments.

If application 308a authorizes the remote connection to IoT node 132d and configures the networking devices of local network 550 to support such a connection, application 308a may initiate a credential exchange 512 with application 308c. During credential exchange 512, application 308a may provide any credential information needed by the entity associated with application 308c to form a VPN or other remote connection to IoT node 132d in local network 550 (e.g., login and password information, etc.). If application 308a opted to change any of the requested parameters for the remote connection, application 308a may also inform application 308c of those changes, as part of credential exchange 512. For instance, if application 308a authorizes and configures a remote connection to IoT node 132d, but at a bandwidth lower than what application 308c requested, application 308a may notify application 308c of the actual allowed bandwidth (e.g., in the case in which the requested bandwidth was optional).

Figure 5E:
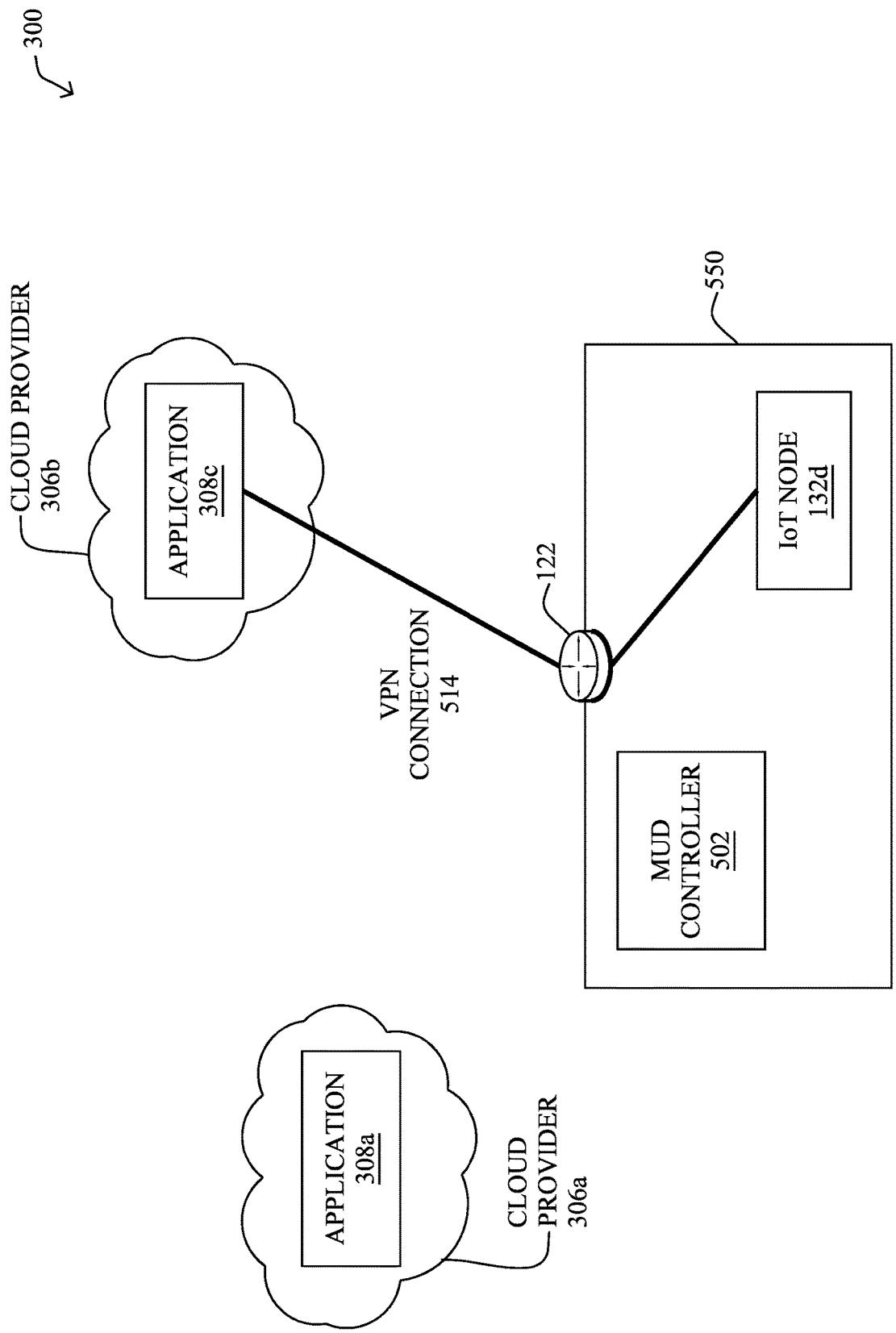

In FIG. 5E, once application 308c has received its remote access credentials, it may form a VPN connection 514 or other secure, remote connection with IoT node 132d in local network 550. This allows the manufacturer, vendor, or other entity associated with IoT node 132d to communicate directly with IoT node 132d, such as by issuing commands to it, making software changes, running troubleshooting routines, or the like. Since application 308a also configured the relevant security policies for VPN connection 514 in advance, the networking devices of local network 550 may also enforce these policies with respect to VPN connection 514. For instance, if a particular security policy limits the protocols that 308c can use to communicate with 132d, this can be enforced via VPN connection 514 to local network 550.

Thus, in various embodiments, a management application (e.g., application 308a) may function as a trust broker between local network 550 and the entity associated with application 308c, to automatically configure a remote connection between the two. Since there exists a trust relationship between both local network 550 and application 308a, as well as between application 308a and application 308c. MUD or another suitable protocol can be used to signal and configure a remote connection directly to an endpoint node that joins local network 550 from the requesting entity.

Figure 6:
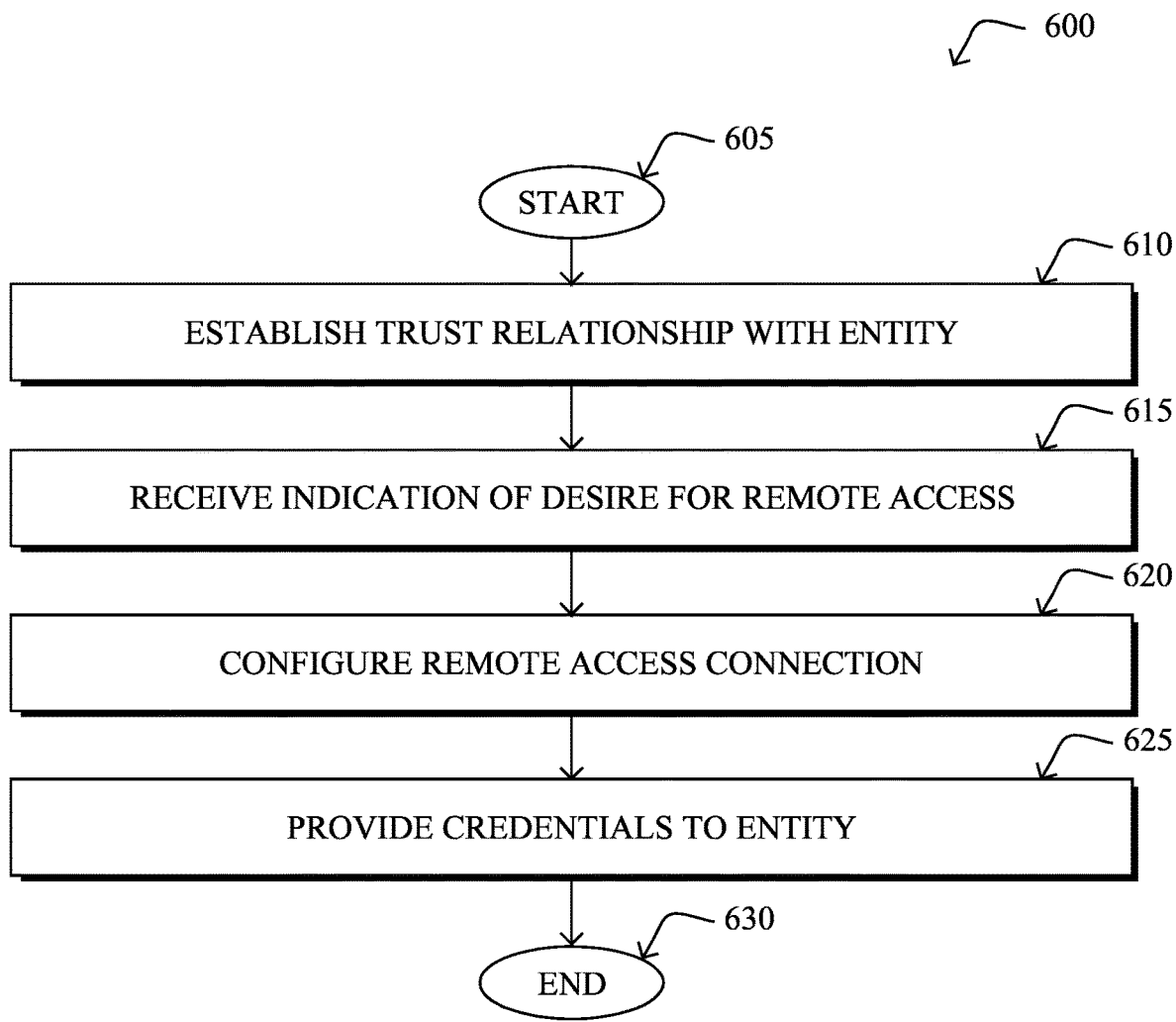
FIG. 6 illustrates an example simplified procedure for configuring a network to provide an entity remote access to a node.

FIG. 6 illustrates an example simplified procedure for configuring a network to provide an entity remote access to a node, in accordance with one or more embodiments described herein. In general, procedure 600 may be performed by a management service for a network executed by a specifically-configured device or set of devices (e.g., a device 200 through execution of data pipeline process 249 and/or data management process 248). The procedure 600 may start at step 605, and continues to step 610, where, as described in greater detail above, the management service may establish a trust relationship with an entity. For instance, such an entity may be the manufacturer or vendor of an endpoint in the network and may comprise one or more servers that communicate with the management service. Such a trust relationship may include, for instance, a secure communication channel between the management service and the entity, as well as the establishment of the requisite security information to support such a channel (e.g., certificates, etc.).

At step 615, as detailed above, the management service may receive, via a Manufacturer Usage Description (MUD) file for the endpoint, an indication that the entity desires remote access to the endpoint in the network. For instance, the endpoint may specify a Uniform Resource Indicator (URI) that specifies a location for the MUD file (e.g., as part of the onboarding of the endpoint to the network) from which the MUD file may be retrieved by the network. In various embodiments, the MUD file may include a description of the endpoint, as is done traditionally under the MUD file, but is also augmented with data indicative of the entity wanting remote access to the endpoint in the network. For instance, the manufacturer or vendor of the endpoint may use this access for purposes of troubleshooting, configuring, and/or downloading software to the endpoint.

At step 620, the management service may configure, based on the indication, the network to provide a remote access connection between the entity and the endpoint in the network, as described in greater detail above. In some embodiments, the management service may also receive contextual information regarding the endpoint and base the configuration of the connection further in part on this contextual information. For instance, the contextual information may indicate a location of the endpoint, a level of the endpoint in a Purdue model, or the like, which the management service may use to create a remote access policy for the endpoint. In some embodiments, the configuration of the network may entail sending an access policy to a VPN concentrator, cloud firewall, or remote desktop protocol (RDP) service associated with the network. In further embodiments, the management service may also configure the remote access connection according to one or more requested parameters for the remote access connection such as a bandwidth for the remote access connection or a protocol with which the entity is to communicate with the endpoint.

At step 625, as detailed above, the management service may provide, to the entity, credentials to the entity for the remote access connection. For instance, the management service may provide a login, password, or other information that the entity may use to form a VPN or other remote access connection to the endpoint in the network. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the automatic establishment of secure, remote access connections to endpoint IoT nodes in a network by a remote entity. In some aspects, a management service may operate as a broker between the network in which the endpoint is located and the remote entity, leveraging its trust relationships with each, to configure the remote access connection.

While there have been shown and described illustrative embodiments for the automatic establishment of a secure remote connection to an IoT node in a network, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network (e.g., by the edge device), etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   establishing, by a management service for a network executed by one or more devices, a trust relationship with an entity associated with an endpoint in the network, wherein the entity is a manufacturer or vendor of the endpoint;
   receiving, at the management service and via a Manufacturer Usage Description file for the endpoint, an indication that the entity desires remote access to the endpoint in the network;
   configuring, by the management service and based on the indication, the network to provide a remote access connection between the entity and the endpoint in the network by providing a virtual private network (VPN) configuration to an edge device in the network that allows the entity to form a VPN connection with the endpoint via the edge device, to enable communication between the manufacturer or vendor of the endpoint and the endpoint using the VPN connection; and
   providing, by the management service and to the entity, credentials to the entity for the remote access connection.

2. The method as in claim 1, wherein the entity comprises one or more servers that communicate with the management service.

3. The method as in claim 1, further comprising:
   receiving, at the management service and from the network, contextual information regarding the endpoint, wherein the management service configures the network to provide the remote access connection based further in part on the contextual information.

4. The method as in claim 1, wherein configuring the network to provide the remote access connection between the entity and the endpoint in the network comprises:
   sending an access policy to a VPN concentrator, cloud firewall, or remote desktop protocol (RDP) service associated with the network.

5. The method as in claim 1, wherein the endpoint sends a Uniform Resource Indicator (URI) that specifies a location of the Manufacturer Usage Description file for the endpoint.

6. The method as in claim 1, further comprising:
   receiving, at the management service, one or more requested parameters for the remote access connection.

7. The method as in claim 1, wherein the entity uses the credentials to troubleshoot, configure, or download software to the endpoint via the remote access connection.

8. The method as in claim 3, wherein the contextual information regarding the endpoint indicates a location of the endpoint or a level of the endpoint in a Purdue model.

9. The method as in claim 6, wherein the one or more requested parameters comprise at least one of: a bandwidth for the remote access connection or a protocol with which the entity is to communicate with the endpoint.

10. An apparatus, comprising:
    one or more network interfaces;
    a processor coupled to the one or more network interfaces and configured to execute one or more processes; and
    a memory configured to store a process that is executable by the processor, the process when executed configured to:
       establish a trust relationship with an entity associated with an endpoint in a network wherein the entity is a manufacturer or vendor of the endpoint;
       receive, via a Manufacturer Usage Description file for the endpoint, an indication that the entity desires remote access to the endpoint in the network;

configure, based on the indication, the network to provide a remote access connection between the entity and the endpoint in the network by providing a virtual private network (VPN) configuration to an edge device in the network that allows the entity to form a VPN connection with the endpoint via the edge device, to enable communication between the manufacturer or vendor of the endpoint and the endpoint using the VPN connection; and provide, to the entity, credentials to the entity for the remote access connection.

11. The apparatus as in claim 10, wherein the entity comprises one or more servers that communicate with the apparatus.

12. The apparatus as in claim 10, wherein the process when executed is further configured to:

receive, from the network, contextual information regarding the endpoint, wherein the apparatus configures the network to provide the remote access connection based further in part on the contextual information.

13. The apparatus as in claim 10, wherein configuring the network to provide the remote access connection between the entity and the endpoint in the network comprises:

sending an access policy to a VPN concentrator, cloud firewall, or remote desktop protocol (RDP) service associated with the network.

14. The apparatus as in claim 10, wherein the endpoint sends a Uniform Resource Indicator (URI) that specifies a location of the Manufacturer Usage Description file for the endpoint.

15. The apparatus as in claim 10, wherein the process when executed is further configured to:

receive one or more requested parameters for the remote access connection.

16. The apparatus as in claim 12, wherein the contextual information regarding the endpoint indicates a location of the endpoint or a level of the endpoint in a Purdue model.

17. The apparatus as in claim 15, wherein the one or more requested parameters comprise at least one of: a bandwidth for the remote access connection or a protocol with which the entity is to communicate with the endpoint.

18. A tangible, non-transitory, computer-readable medium storing program instructions that cause a management service for a network to execute a process comprising:

establishing, by the management service for a network, a trust relationship with an entity associated with an endpoint in the network, wherein the entity is a manufacturer or vendor of the endpoint;

receiving, at the management service and via a Manufacturer Usage Description file for the endpoint, an indication that the entity desires remote access to the endpoint in the network;

configuring, by the management service and based on the indication, the network to provide a remote access connection between the entity and the endpoint in the network by providing a virtual private network (VPN) configuration to an edge device in the network that allows the entity to form a VPN connection with the endpoint via the edge device, to enable communication between the manufacturer or vendor of the endpoint and the endpoint using the VPN connection; and providing, by the management service and to the entity, credentials to the entity for the remote access connection.

* * * * *